United States Patent
Scheel et al.

(10) Patent No.: US 7,948,774 B2
(45) Date of Patent: May 24, 2011

(54) RESONANT DC/DC CONVERTER WITH ZERO CURRENT SWITCHING

(75) Inventors: Thomas Scheel, Stolberg (DE); Peter Luerkens, Aachen (DE); Christoph Loef, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 502 days.

(21) Appl. No.: 11/912,671

(22) PCT Filed: Apr. 13, 2006

(86) PCT No.: PCT/IB2006/051148
§ 371 (c)(1), (2), (4) Date: Oct. 26, 2007

(87) PCT Pub. No.: WO2006/114719
PCT Pub. Date: Nov. 2, 2006

(65) Prior Publication Data
US 2008/0198634 A1      Aug. 21, 2008

(30) Foreign Application Priority Data

Apr. 26, 2005  (EP) .................................. 05103359

(51) Int. Cl.
*H02M 3/335* (2006.01)
(52) U.S. Cl. .............................. 363/17; 323/235; 363/98

(58) Field of Classification Search ............... 363/21.01, 363/21.02, 21.03, 95, 97, 98, 131, 132, 17; 323/235
See application file for complete search history.

(56) References Cited

U.S. PATENT DOCUMENTS

| | | | |
|---|---|---|---|
| 4,648,017 A * | 3/1987 | Nerone | 363/80 |
| 5,121,314 A | 6/1992 | Cathell et al. | |
| 5,534,766 A | 7/1996 | Bonissone et al. | |
| 6,341,078 B1 * | 1/2002 | Miller | 363/98 |
| 6,563,717 B2 | 5/2003 | Lunding et al. | |
| 6,643,146 B2 | 11/2003 | Boeke | |
| 2003/0205572 A1 | 11/2003 | Bassill et al. | |
| 2004/0037100 A1 * | 2/2004 | Orr et al. | 363/131 |
| 2004/0125624 A1 * | 7/2004 | Scheel et al. | 363/89 |

FOREIGN PATENT DOCUMENTS
JP    09163735 A    6/1997
WO    2004064237 A1    7/2004
* cited by examiner

*Primary Examiner* — Harry Behm
*Assistant Examiner* — Matthew Grubb

(57) ABSTRACT

A resonant DC/DC converter for supplying an output power comprises a switching device (18) for supplying a switched voltage (UWR) to a resonant circuit (20) having a transformer (T). The switched voltage (UWR) is derived from an intermediate circuit voltage (Uz) having a fixed pulse width and frequency so that the zero crossings of the resonant current (Ires) generated in the resonant current are defined. The switching configuration of an inverter circuit (18) is selected by a control device (31) to either increase, decrease or maintain at a substantially constant level the resonant current according to the polarity of the switched voltage, so as to control the output power as required.

17 Claims, 6 Drawing Sheets

| | u1 (Inverter 1) | u2 (Inverter 1) | u3 (Sum) | |
|---|---|---|---|---|
| 1 | + | + | +1 | |
| 2 | + | 0 | +1/2 | |
| 3 | 0 | 0 | 0 | |
| 4 | - | 0 | -1/2 | |
| 5 | - | - | -1 | |
| 6 | + | + | +1 | |
| 7 | 0 | + | +1/2 | |
| 8 | - | + | 0 | Undesired |
| 9 | 0 | - | -1/2 | |
| 10 | + | - | 0 | Undesired |

RESONANT DC/DC CONVERTER WITH ZERO CURRENT SWITCHING

This invention relates to a resonant DC/DC power converter for supplying an output power for use by, for example, an X-ray tube and, more particularly to a resonant DC/DC power converter with zero current switching.

Modern resonant DC/DC converters, such as those used for x-ray tube voltages, are operated with very high switching frequencies. It is evident that any switching losses incurred by the associated power switches in a single switching cycle have to be reduced in order to limit the overall power losses. One established method of doing this is Zero Current Switching (ZCS), where turning the power switches on and off is only permitted at or near the zero crossings of the resonant current. This method is common practice in soft switching converters but has the drawback that it inhibits the controllability of the output power. ZCS and good controllability are effectively conflicting requirements, as good controllability is normally achieved by a continuous control of the on-time of the power switches, in which case ZCS cannot be guaranteed for all points of operation and switching losses emerge, such that there tends to be a trade off between switching losses and controllability of the output power.

WO 2004/064237 describes a series resonant converter comprising a switching device, resonant circuit and a rectifier, having actuations controlled by a digital control device. At least one correcting variable is calculated, from which actuations for the switching device, i.e. switching frequency & pulse width or pulse duty factor of the switched voltage to be generated, can be determined unambiguously. A first actual value, dependent on the output voltage, is processed, as well as a second actual value which is dependent on the voltage across a resonant capacitor. The first and second actual values are linked accordingly to the selected control structure for variable calculation. Controller coefficients are used, by which processed variables are multiplied. The controller does not process measured values of the above-mentioned actual values themselves, but changes of such measured values over time.

The control device of WO 2004/064237 is structured in the form of a differential PI controller, with the control deviation and difference values of the processed actual values and a coupled-back, time delayed difference value of the correcting variable are in each case multiplied by controller coefficients and summed. The result is in turn temporally summed in order to calculate the correcting variable. Dynamic limiting is also achieved by the use of another control device that comes into play if the first controller predefines a correcting variable that would lead to critical operating state.

While the control strategy described in WO 2004/064237 gives good results in the presence of non-linear control paths, such as mixed mode modulation, it has the drawback of higher switching losses when operating at high frequencies. It is not possible to ensure ZCS for every switching cycle as it makes use of pulse frequency modulation (PFM) to control the output power.

It is an object of the invention to provide a resonant power converter, a method of controlling a resonant power converter and a control device for a resonant power converter, wherein effective control of the output power of the converter is achieved whilst ensuring ZCS for each switching cycle.

In accordance with the present invention, there is provided a resonant power converter for supplying an output power, comprising:

a switching device for converting an intermediate circuit voltage into a switched voltage;

a resonant circuit realised by means of a transformer for supplying an output voltage and being fed by the switched voltage so as to generate a resonant current;

the power converter further comprising an inverter circuit comprising a plurality of switches and respective rectifying components for defining the current flow path around said inverter circuit according to the switch configuration thereof;

and a control device for selecting one of a plurality of switch configurations of said inverter circuit dependent on a required output power of said converter;

wherein the frequency and pulse width of said intermediate circuit voltage are adjusted such that switching events of said inverter circuit occur at or adjacent to the zero crossings of said resonant current;

Thus, the above-mentioned object is achieved by switching the power switches only at or near (i.e. shortly before or shortly after) the zero crossings of the resonant current By this definition, the pulse width and the frequency of the applied converter voltage are self-adjusting and cannot be used to adjust the output power. The power is controlled instead by selecting a switch configuration, defined by which of the power switches are turned on or off, resulting in a converter that has an output power controllable over a wide range yet able to effectively limit switching losses by ensuring ZCS for every switching cycle.

It will be appreciated that the resonant circuit consists of at least a series capacitor and a series inductance, realised by means of the transformer.

Also in accordance with the present invention, there is provided a method of controlling a resonant power converter as defined above, comprising the steps of receiving data representative of a required output power of said converter, and selecting one of a plurality of switch configurations of said inverter circuit dependent on said required output power of said converter.

Still further in accordance with the present invention, there is provided a control device for a resonant power converter as defined above, the control device comprising an input for receiving data representative of a required output power of said converter, means for selecting one of a plurality of switching configurations of said inverter circuit dependent on said required output power of said converter, and an output for outputting a signal for causing respective switches of said inverter circuit to be configured according to said selected switching configuration.

Beneficially, the plurality of switch configurations include first and second switch configurations for increasing or decreasing the resonant current by controlling the phase relationship of the switched voltage versus the resonant current. The converter is preferably arranged and configured such that the resonant current is increased if, by the selection of a first switch configuration, the voltage is in-phase (+) with the resonant current, and decreased if, by the selection of a second switch configuration, the switched voltage is in antiphase (i.e. 180 degree phase-shift)(−) with the resonant current. Preferably, the plurality of switch configurations further includes a third switch configuration (idle, O) for maintaining the resonant current at a substantially constant level. In the third switch configuration, the switched voltage is beneficially substantially zero.

Beneficially, said resonant circuit is of LCC or LC configuration and includes a series resonant capacitor, and values representative of a voltage across said series resonant capacitor and said output voltage are input to said control device. The control device preferably comprises a multi-level controller including a plurality of outputs corresponding to respective said plurality of switch configurations. Said plurality of outputs preferably comprise respective next output voltage step values which are input to a decision block. The decision block is beneficially arranged and configured to compare each of said step values to a reference value representative of a desired next output voltage to determine which is the closest, and to output a control value to cause an appropriate switch configuration to be selected.

Said inverter circuit may comprise a full-bridge inverter, and the rectifying components may comprise diodes, and more preferably anti-parallel diodes.

The converter may comprise a plurality of inverter circuits, preferably working on a single transformer, wherein the number of inverter circuits determines the number of switch configurations from which said control device can select.

Figure 1:
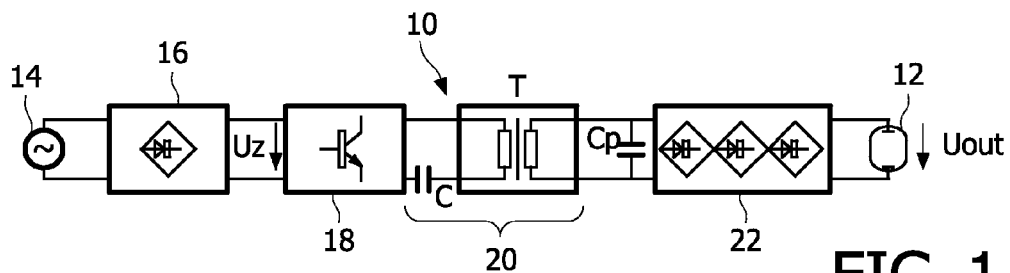
FIG. 1 is a schematic circuit diagram of a high-voltage power supply unit for an X-ray tube.

Referring to FIG. 1 of the drawings, shows a power supply unit 10 for an X-ray tube 12 comprises an AC voltage supply 14, for example, a connection to a supply network, supplying, after rectification by means of a rectifier unit 16, an intermediate circuit voltage $U_Z$ to an inverter 18. The inverter 18 converts the intermediate circuit DC voltage $U_Z$ into a switching voltage which is supplied to a resonant circuit 20 comprising a series capacitor C, and a transformer T. The parallel capacitance Cp at the secondary winding of the transformer T can be the parasitic capacitance of the transformer T, or an additional external capacitor. The secondary winding of the transformer T, an output voltage is generated by means of a multiplier circuit 22, the general configuration of which is known, and the output voltage $U_{out}$ is then supplied to the X-ray tube 12.

Figure 2:
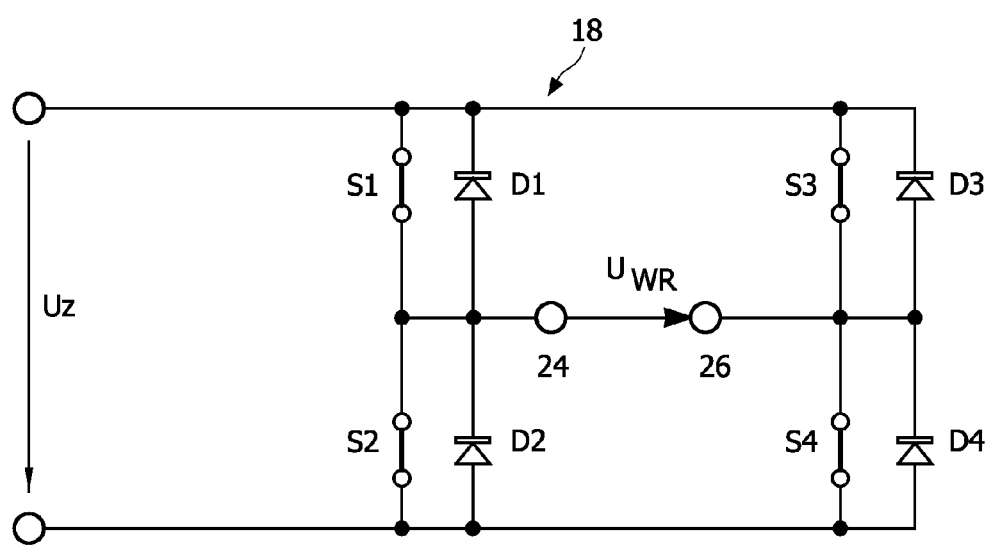
FIG. 2 is a circuit diagram illustrating an inverter circuit.

FIG. 2 is a circuit diagram of an exemplary inverter 18. In the example shown, this is a full bridge circuit, in which the DC voltage $U_Z$ is converted into a switched output voltage Uwr by means of four controlled power switches S1, S2, S3, and S4. Anti-parallel diodes (that is, with the reverse forward direction with respect thereto) D1, D2, D3, D4 are in each case assigned to the switches S1, S2, S3, S4. The resonant current flowing between points 24 and 26 is designated $I_{res}$.

Figure 3:
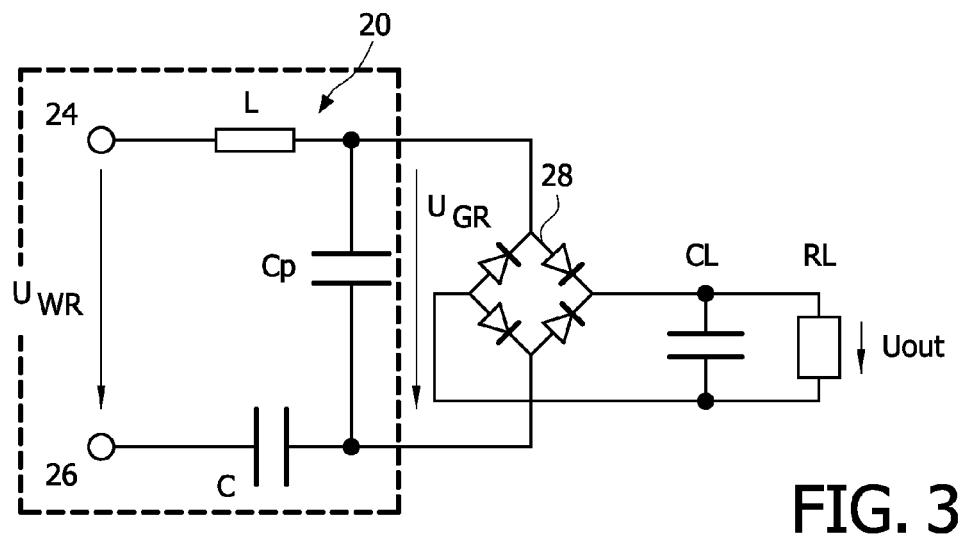
FIG. 3 is an equivalent circuit diagram of a resonant power converter.

As shown in FIG. 1, the resonant circuit that is supplied by the switching unit 18 comprises a series capacitor C, a parallel capacitor Cp and a transformer T. A few simplifications (substitution of the multiplier circuit 22 by a bridge rectifier 26, an ideal transformer T with unity turn ratio having constant winding ratio, infinite mutual inductance, and neglecting losses during rectification) and the transformation of all electrical quantities to the primary side of the transformer T, result in the equivalent circuit diagram shown in FIG. 3. The voltage across the series resonant capacitor C is designated $u_C$. The leakage inductance of the transformer T is designated L, Across the ideal rectifier 28 there is the AC voltage $u_{GR}$, from which the voltage $U_{out}$ is generated that supplies a load capacitor $C_L$ and a load resistor $R_L$, which represents the X-ray tube 12.

The power supply unit 10 is operated such that there are three different operation modes with different respective actuations. These operating modes will now be described with reference to FIGS. 4, 5 and 6, which represent a circuit combining both aforementioned FIGS. 2 and 3 in respect of reference points 24 and 26.

Figure 4:
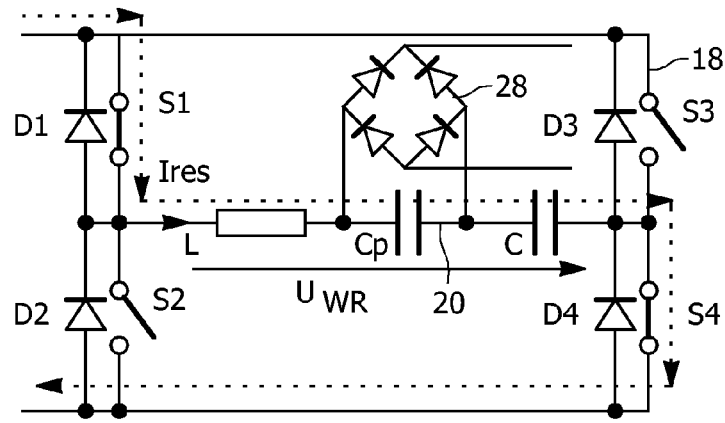
FIG. 4 is a schematic diagram illustrating the current path of the resonant current circuit when an inverter circuit of a resonant power converter according to an exemplary embodiment of the present invention is performing an in-phase switch configuration.

Referring to FIG. 4 of the drawings, in first operating mode, categorized as the in-phase switch configuration or state, switches S1 and S4 are turned on, while the other two switches are turned off, such that a positive resonant current $I_{res}$ flows directly through S1 and S4. In this instance a positive voltage+$U_Z$ is applied to the resonant circuit 20 and consequently the resonant voltage has the same polarity as the resonant current. As a result, energy is transferred from the intermediate circuit voltage into the resonant circuit 20 and the resonant current is stimulated resulting in an increase in the amplitude thereof. Similarly, the switch configuration that would achieve the same actuation, but this time for a negative resonant current is given by S2 and S3 conducting while S1 and S4 are off.

Figure 5:
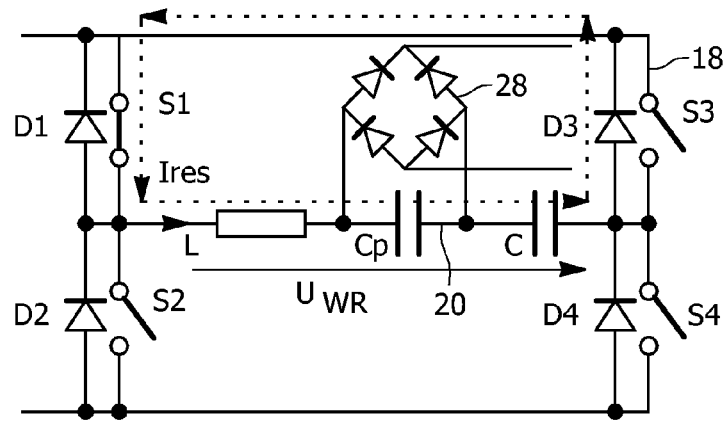
FIG. 5 shows a schematic diagram illustrating the current path of the resonant current when an inverter circuit of a resonant power converter according to an exemplary embodiment of the present invention is in an idle switching state.

A second operating mode, categorized as the idle switching state, is achievable by four possible switch configurations, two for each direction of resonant current. Referring to FIG. 5 of the drawings, if only switch S1 is on, then the resonant current flows through switch S1 and the conducting anti-parallel diode D3. This configuration is characterised by a circular current flow. As the applied resonant voltage is zero, there is no additional energy drawn from the intermediate supply into the resonant circuit 20 to either stimulate or dampen the amplitude of $I_{res}$. The resonant current is only dampened by resistive losses in the circuit and the energy transfer from the resonant circuit 20 to the output 12. A similar result is obtained if only S4 is closed, in which case $I_{res}$ will flow through S4 and D2. The applied resonant voltage is also zero. For negative resonant current the equivalent idle configurations are given by S2 conducting while S1, S3, S4 are open or S3 conducting while S1, S2, S4 are open.

Figure 6:
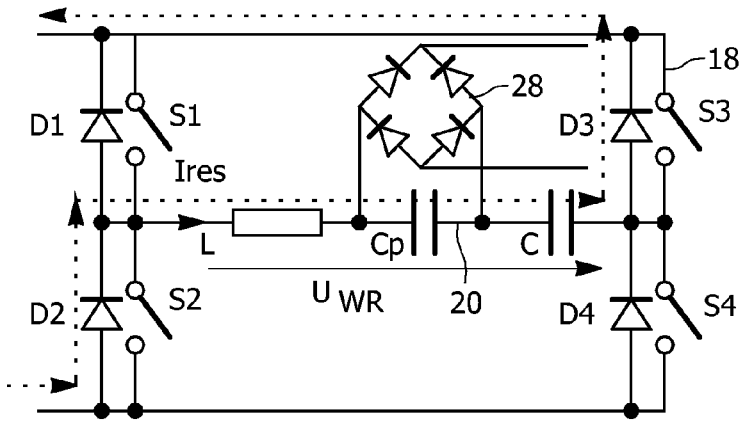
FIG. 6 shows a schematic diagram illustrating the current path of the resonant current when an inverter circuit of a resonant power converter according to an exemplary embodiment of the present invention is in an anti-phase switching state.

Referring to FIG. 6 of the drawings, in a third operating mode, a positive resonant current, switches S1, S2, S3 and S4 are off. This is categorized as the anti-phase switch configuration or state, in which the resonant current has to flow through diodes D2 and D3. The applied resonant voltage Uwr is then −$U_Z$ and has an opposite polarity to that of the resonant current, thus energy is transferred in the reverse direction from the resonant circuit into the DC supply. Accordingly, the resonant current will be actively damped and its amplitude significantly lowered. For negative resonant current all switches again have to be open, but in this instance the resonant current will flow through D1 and D4. It will be appreciated that it is still allowed to turn on those switches, which are in parallel to the diodes which are conducting the resonant current, in the case when all switches are turned off.

Figure 7:
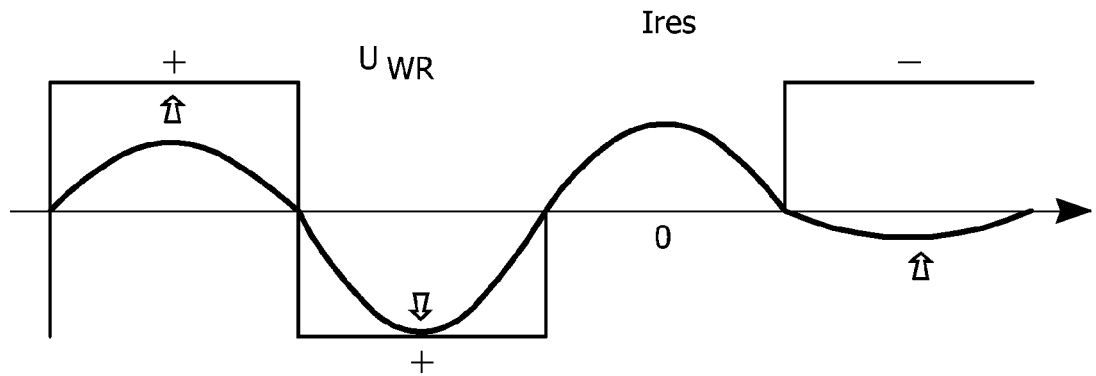
FIG. 7 is a graphical representation of the waveforms for resonant current $I_{res}$ and converter voltage Uwr for the three switch configurations illustrated by FIGS. 4 to 6 respectively.

FIG. 7 illustrates the variation over time for the variables Uwr and $I_{res}$ in relation to the three operating modes as described above in-phase switching state, here denoted by a "+"-sign, and seen in the first two switching cycles, idle switching state denoted with a "0"-sign and shown in the third switching cycle, and negative switching state, denoted by a "−"-sign and shown in the fourth switching cycle. Each switching cycle ends and the next one begins at the zero crossing of the resonant current $I_{res}$, enabling zero current switching hence the resulting switching losses are at a minimum. As mentioned previously, the frequency and the pulse width of the applied converter voltage are determined by the zero crossings of the resonant current and, as such, cannot be used to control the output power.

FIG. 7 illustrates how the output power can be controlled in accordance with this invention by using Uwr to increase (+), have no effect (0) on, or dampen (−) the amplitude of the resonant current $I_{res}$.

Figure 8:
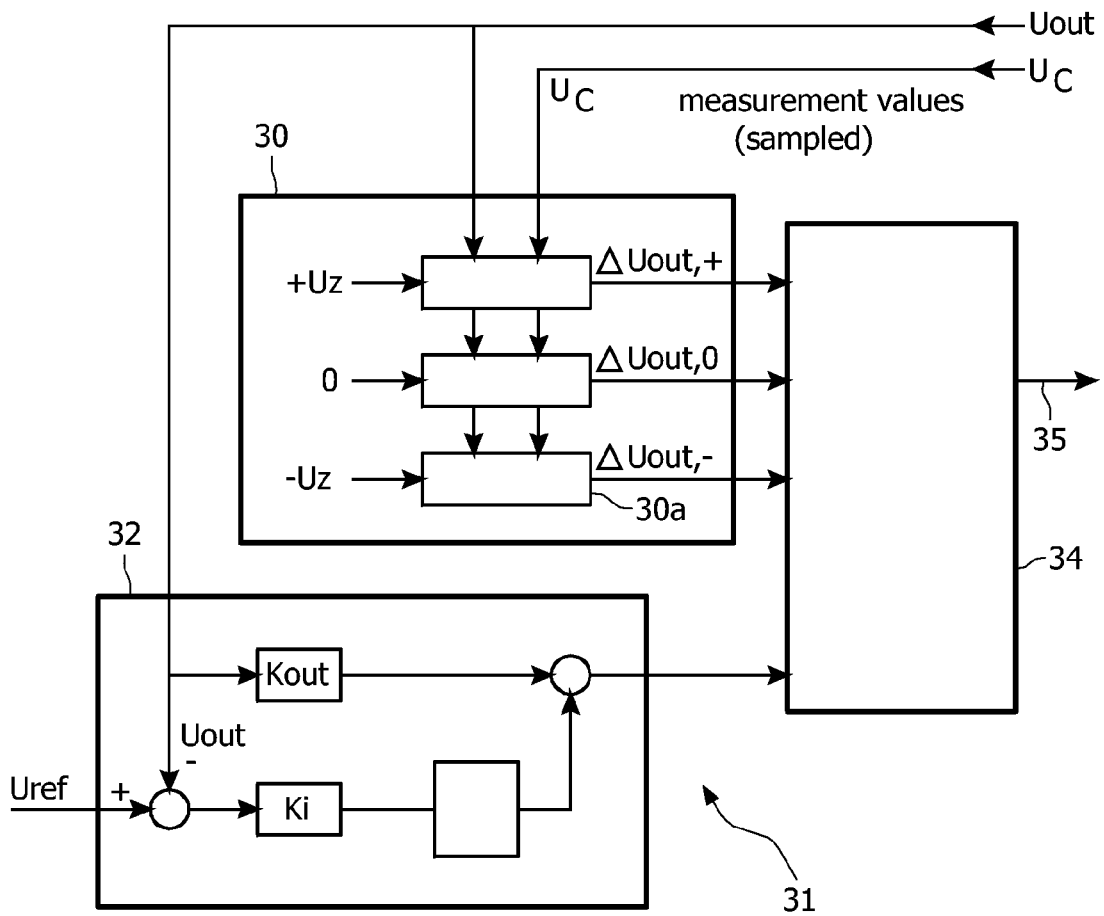
FIG. 8 is a block diagram of a three-level control structure for the positive, idle and anti-phase switching configurations illustrated in FIGS. 4 to 6 respectively.

FIG. 8 is illustrative of the manner in which the power supply unit 10 may be controlled. The voltage $u_c$ across the series resonant capacitor and the output voltage $U_{out}$ are measured and sampled before being fed to elements of a three-level controller. A predictor 30 has input from both $u_c$ and $U_{out}$ lines and uses these two values to generate by means of respective analytical model blocks 30a) three theoretical output variation values, $\Delta U_{out}+$, $\Delta U_{out}0$ and $\Delta U_{out}-$ that would result by applying the three corresponding respective operating modes or switching states to the previous sequence output voltage $U_{out}$. This prediction can be made on the base of an analytical dynamic model, as will be apparent to a person skilled in the art. The model is not required to be implicitly accurate and an approximation of the exact model is sufficient, as the resulting three-level controller is very robust to tolerances of the system parameters.

A PI-controller 32 processes a sampled input from the output voltage Uout and an input reference voltage $U_{ref}$ such that the output $\Delta U_{out,ref}$ is a desired value for the next output voltage step $\Delta U_{out}$. The functional aspect a PI-controller is common knowledge to a person skilled in the art and, as such will not be described in detail here. Adequate information is considered to be provided in FIG. 8 to establish its relevance of application. It will be appreciated that the present invention is not necessarily limited to use in a PI-controller; it is envisaged that it can be relatively easily applied to other controllers.

Finally the desired output voltage $\Delta U_{out,ref}$ from the PI-controller 32 and the three predicted output variation values, $\Delta U_{out}+$, $\Delta U_{out}0$ and $\Delta U_{out}-$ are used as input for a decision block 34, where the three output variation values are compared to the desired output voltage to establish which is the closest. The decision block 34 then outputs a control value 35 (+, −, 0) to cause the relevant operating mode to be entered, resulting in the inverter 18 being caused to enter either an in-phase, idle or anti-phase switching state as described above.

Figure 9:
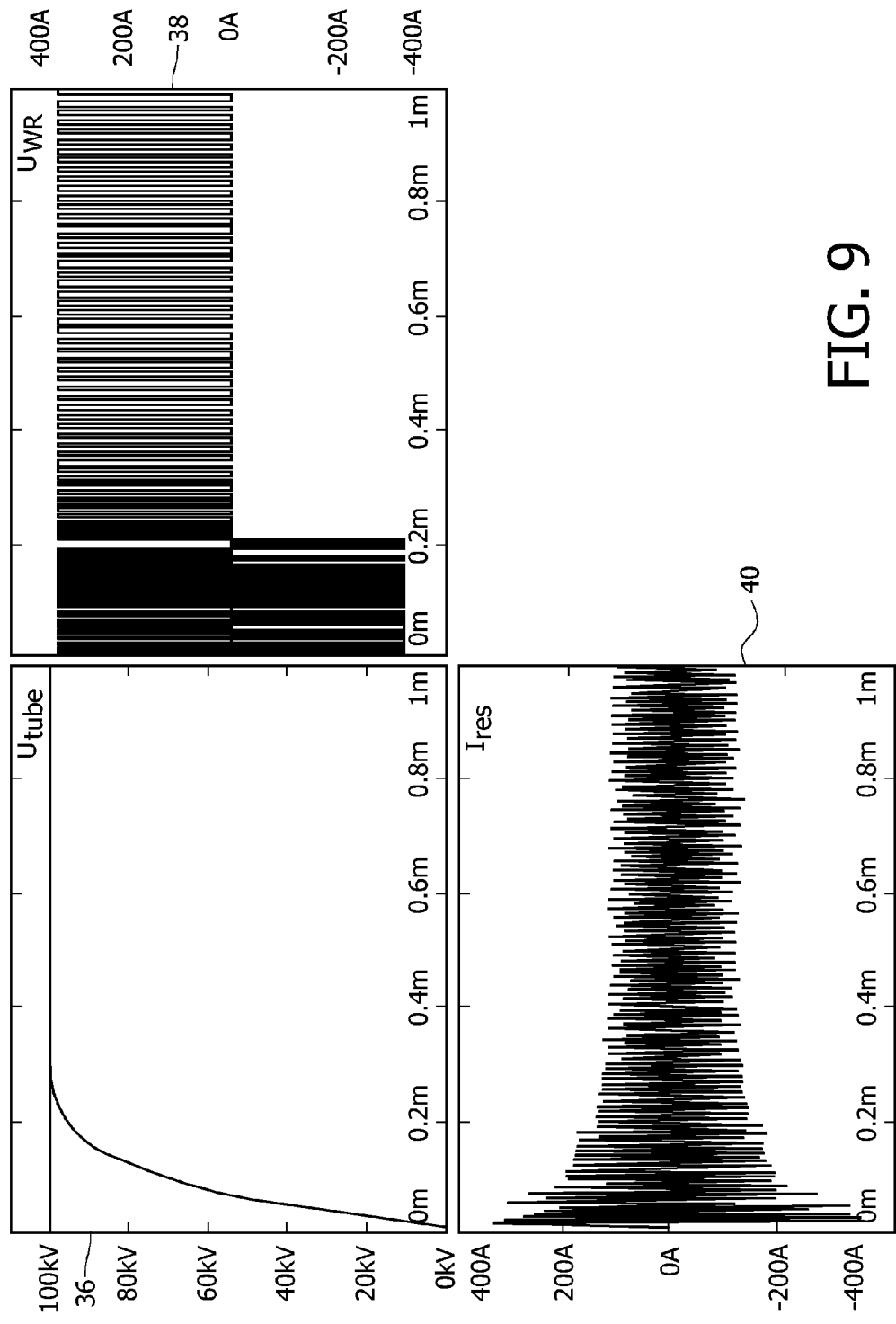
FIG. 9 illustrates graphically a simulation of use of the three-level control structure described with reference to FIG. 8.

FIG. 9 is illustrative of the result of a simulation of the described control algorithm. Reference numeral 36 denotes the output voltage $U_{tube}$ supplied to the X-ray tube, for a step response for a reference tube voltage of 100 kV. The rise time is approximately 0.3 ms with no overshoot. The corresponding converter voltage Uwr is denoted by reference numeral 38 and resonant current $I_{res}$ for the step response is denoted by reference numeral 40. The overall control performance is very robust to load or system parameter variations.

Figure 10:
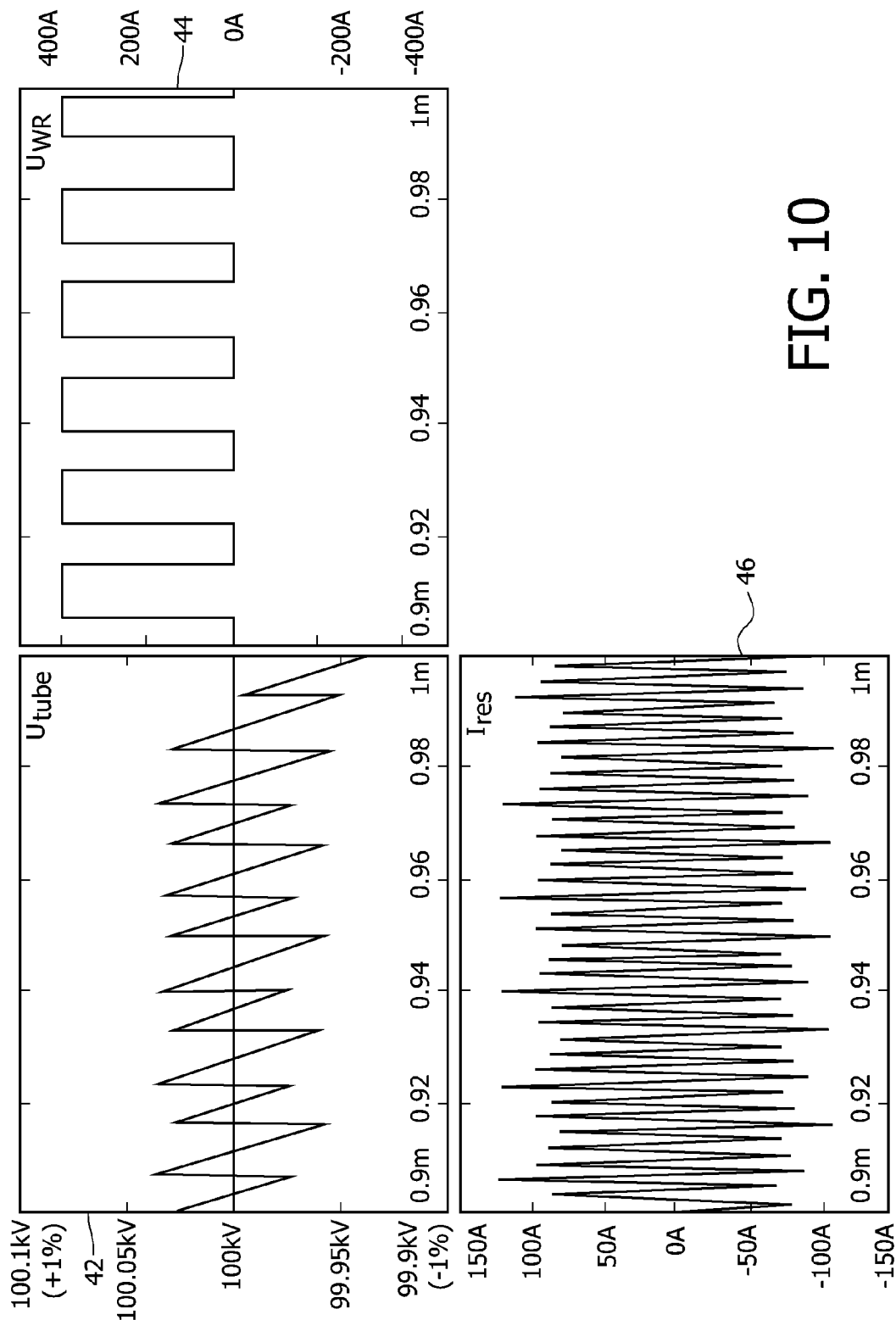
FIG. 10 is a zoomed-in version of the simulation of FIG. 9.

FIG. 10 is a magnified illustration of the parameters of FIG. 9 in respect of the time interval 0.9 ms to 1 ms. The y-axis is also magnified. In the box denoted by reference numeral 42, it can be seen that the output tube reference voltage $U_{tube}$ has a certain ripple due to the discrete steps of the applied converter voltage. In this particular case it can be seen to be +−50V, which is 0.05% of the output voltage and thus negligible. The box denoted by reference numeral 44 shows the resulting converter voltage. It is evident that the applied control strategy leads to a converter voltage with a very low frequency, in order to deal with the low output power in this case. The magnified resonant current is shown in the box denoted by reference numeral 46.

Figures 11, 12:
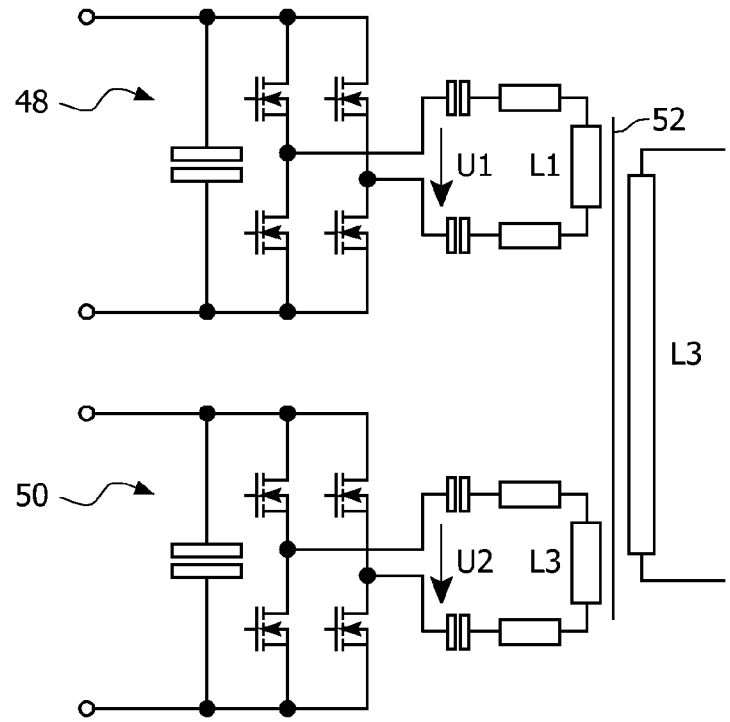
FIG. 11 is a schematic diagram illustrating how two independent inverters can operate on one transformer in a resonant power converter according to an exemplary embodiment of the invention.
FIG. 12 is a table indicating the multiple actuation levels achievable by combining more than one inverter in the resonant power converter described with reference to FIG. 11.

FIG. 11 is a schematic circuit diagram illustrating how two inverter circuits 1 and 2, 48, 50 can work on one transformer 52 with multiple windings. Here the amplitude of discrete steps of the converter voltage Uwr would be reduced, resulting in an even lower output voltage ripple 42. Due to the coupling of the two resonant circuits by the common transformer a voltage divider function is realised. Instead of switching between three operation modes as described above in relation to a first exemplary embodiment of the present invention, here five relevant modes are achievable. The five voltage levels created by these modes are categorised +1, +½, 0, −½, −1, and result as a combination of the +,− and 0 modes of the two independent inverters 48, 50.

Possible combinations are provided in the table of FIG. 12, assuming a good coupling between L1 and L2. The states 8 and 10 are not desirable because the resonant current in both inverters is significantly larger than in state 3, thus state 3 is the preferred combination for generating an idle or "0" mode. The model described above for a three-level controller can, of course, be relatively easily adapted to a five-level controller, or generalised to a multi-level controller in the case that more than two independent inverters are used. For the multi-level control structure, and referring back to FIG. 8, the predictor 30 has to be extended to predict the $\Delta U_{out}$ for all possible switch configurations. The decision block 34 can then select the $\Delta U_{out}$ that is closest to the output of the PI-controller 32.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A resonant power converter for supplying an output power, comprising:
a resonant circuit comprising:
a transformer for supplying an output voltage, wherein the transformer receives a switched voltage input-and generates an output resonant current;
a switching device for converting a voltage of an intermediate circuit into the switched voltage, the switching device comprising:
an inverter circuit comprising a plurality of switches and respective components for defining a current flow path around said inverter circuit according to a switch configuration thereof; and
a control device for selecting one of a plurality of switch configurations of said inverter circuit dependent on a required output power of said converter;
wherein a frequency and pulse width of said intermediate circuit are adjusted such that switching events of said inverter circuit occur at or adjacent to zero crossings of said output resonant current; and
wherein said plurality of switching configurations include first and second switching configurations for increasing or decreasing the resonant current by controlling the phase relationship of the switched voltage with resect to the resonant current.

2. A converter according to claim 1, arranged and configured such that the resonant current is increased if, by the selection of a first switching configuration, switched voltage is in-phase with the resonant current, and decreased if, by the selection of a second switch configuration, the switched voltage is in anti-phase with the resonant current.

3. A converter according to claim 1, wherein said plurality of switch configurations further includes a third switch configuration for maintaining the resonant current at a substantially constant level.

4. A converter according to claim 3, wherein in said third switching configuration, the switch voltage is substantially zero.

5. A converter according to claim 1, wherein said inverter and said components comprise diodes.

6. A converter according to claim 1, comprising a plurality of inverter circuits working on a single transformer, wherein the number of inverter circuits determines the number of switch configurations from which said control device can select.

7. A control device for a resonant power converter according to claim 1, the control device comprising:
an input for receiving data representative of a required output power of said converter;
means for selecting one of a plurality of switch configurations of said inverter circuit dependent on said required output power of said converter; and
an output for outputting a signal for causing respective switches of said inverter circuit to be configured according to said selected switching configuration.

8. A method of controlling a resonant power converter according to claim 1, the method comprising the steps of:
receiving data representative of a required output power of said converter; and
selecting one of a plurality of switch configurations of said inverter circuit dependent on said required output power of said converter.

9. The method according to claim 8, whereby said plurality of switching configurations include first and second switching configurations for increasing or decreasing the resonant current by controlling the phase relationship of the switched voltage with respect to the resonant current.

10. The method according to claim 9, whereby the converter is arranged and configured such that the resonant current is increased if, by the selection of a first switching configuration, switched voltage is in-phase with the resonant current, and decreased if, by the selection of a second switch configuration, the switched voltage is in anti-phase with the resonant current.

11. The method according to claim 9, whereby said plurality of switch configurations further includes a third switch configuration for maintaining the resonant current at a substantially constant level.

12. The method according to claim 11, whereby in said third switching configuration, the switch voltage is substantially zero.

13. The method according to claim 8, whereby said resonant circuit includes a series resonant capacitor, and values representative of a voltage across said series resonant capacitor and said output voltage are input to said control device.

14. A resonant power converter for supplying an output power, comprising:
a resonant circuit comprising:
a transformer for supplying an output voltage, wherein the transformer receives a switched voltage input-and generates an output resonant current;
a switching device for converting a voltage of an intermediate circuit into the switched voltage, the switching device comprising:
an inverter circuit comprising a plurality of switches and respective components for defining a current flow path around said inverter circuit according to a switch configuration thereof; and
a control device for selecting one of a plurality of switch configurations of said inverter circuit dependent on a required output power of said converter;
wherein a frequency and pulse width of said intermediate circuit are adjusted such that switching events of said inverter circuit occur at or adjacent to zero crossings of said output resonant current; and
wherein said resonant circuit includes a series resonant capacitor, and values representative of a voltage across said series resonant capacitor and said output voltage are input to said control device.

15. A converter according to claim 14, comprising a multilevel controller including a plurality of outputs corresponding to respective said plurality of switch configurations.

16. A converter according to claim 15, wherein said plurality of outputs comprising respective next output voltage step values input to a decision block.

17. A converter according to claim 16, wherein said decision block is arranged and configured to compare each of said step values to a reference value representative of a desired next output voltage to determine which is the closest, and to output a control value to cause an appropriate switch configuration to be selected.

* * * * *